US012780724B2

(12) United States Patent
Cui et al.

(10) Patent No.: US 12,780,724 B2
(45) Date of Patent: Nov. 3, 2026

(54) GLASS SUBSTRATE, MANUFACTURING METHOD THEREFOR, AND ELECTRONIC DEVICE

(71) Applicant: BYD COMPANY LIMITED, Shenzhen (CN)

(72) Inventors: Jingna Cui, Shenzhen (CN); Jiaxin Zhang, Shenzhen (CN); Yulei Pei, Shenzhen (CN); Shuang Wu, Shenzhen (CN); Qiying Gai, Shenzhen (CN)

(73) Assignee: BYD COMPANY LIMITED, Shenzhen (CN)

( * ) Notice: Subject to any disclaimer, the term of this patent is extended or adjusted under 35 U.S.C. 154(b) by 113 days.

(21) Appl. No.: 18/633,479

(22) Filed: Apr. 11, 2024

(65) Prior Publication Data

US 2024/0254038 A1 Aug. 1, 2024

Related U.S. Application Data

(63) Continuation of application No. PCT/CN2022/120611, filed on Sep. 22, 2022.

(30) Foreign Application Priority Data

Oct. 12, 2021 (CN) .......................... 202111189979.8

(51) Int. Cl.
*C03C 21/00* (2006.01)

(52) U.S. Cl.
CPC .................................. *C03C 21/002* (2013.01)

(58) Field of Classification Search
CPC .................................................... C03C 21/002
See application file for complete search history.

(56) References Cited

U.S. PATENT DOCUMENTS

| | | | | |
|---|---|---|---|---|
| 2017/0247291 | A1* | 8/2017 | Hatano | C03C 21/002 |
| 2020/0017406 | A1 | 1/2020 | Wilson et al. | |
| 2021/0139371 | A1 | 5/2021 | Luzzato et al. | |

FOREIGN PATENT DOCUMENTS

| | | | |
|---|---|---|---|
| CN | 107117801 | A | 9/2017 |
| CN | 107117810 | A | 9/2017 |
| CN | 107721154 | A | 2/2018 |
| CN | 108455829 | A | 8/2018 |

(Continued)

OTHER PUBLICATIONS

CN111302654A English Translation Description Original, Hu et. al. “Single-sided dominant compressive stress glass, preparation method and application thereof”, Espacenet, Jan. 13, 2026, Jun. 19, 2020, Year 2020 (Year: 2020).*

(Continued)

*Primary Examiner* — Alison L Hindenlang
*Assistant Examiner* — Christopher Paul Daigler
(74) *Attorney, Agent, or Firm* — Wenye Tan

(57) ABSTRACT

A glass substrate and a method for preparing the same, and an electronic device are provided. Two opposite sides of the glass substrate respectively have a first surface compressive stress layer and a second surface compressive stress layer. A surface compressive stress of the first surface compressive stress layer is greater than a surface compressive stress of the second surface compressive stress layer, and a depth of the first surface compressive stress layer is less than a depth of the second surface compressive stress layer.

12 Claims, 3 Drawing Sheets

~100

(56) References Cited

FOREIGN PATENT DOCUMENTS

| | | | | |
|---|---|---|---|---|
| CN | 209259943 | U | | 8/2019 |
| CN | 110304841 | A | | 10/2019 |
| CN | 110382433 | A | | 10/2019 |
| CN | 110713351 | A | | 1/2020 |
| CN | 111204991 | A | | 5/2020 |
| CN | 111302654 | A | * | 6/2020 |
| JP | 2020510595 | A | | 4/2020 |

OTHER PUBLICATIONS

The World Intellectual Property Organization (WIPO) International Search Report for PCT/CN2022/120611 Nov. 28, 2022 5 Pages (including translation).

* cited by examiner

GLASS SUBSTRATE, MANUFACTURING METHOD THEREFOR, AND ELECTRONIC DEVICE

CROSS-REFERENCE TO RELATED APPLICATIONS

This application is a continuation application of PCT application No. PCT/CN2022/120611, filed on Sep. 22, 2022, which claims priority to Chinese Patent Application No. 202111189979.8, entitled "GLASS SUBSTRATE AND METHOD FOR PREPARING SAME, AND ELECTRONIC DEVICE" and filed on Oct. 12, 2021. The entire content of all of the above-referenced applications is incorporated herein by reference.

FIELD

The present disclosure relates to the technical field of glass products, and specifically, to a glass substrate and a method for preparing the same, and an electronic device.

BACKGROUND

At present, an electronic device often uses glass as a screen cover plate or a back cover plate, but glass has the problems of poor impact resistance and easy crushing. When the electronic device accidentally falls off or is impacted by an external force, the glass bends to deform and is crushed, which reduces the aesthetics of the electronic device and even affects the normal use of the electronic device. Therefore, it is necessary to provide new glass to improve the impact resistance of the electronic device and ensure that the electronic device has long service life.

SUMMARY

In view of this, the present disclosure provides a glass substrate. Two opposite side surfaces of the glass substrate have different compression stress distributions, so that one side of the glass substrate can resist an impact of a hard object, and the other side can withstand a tension of a bending deformation. When the glass substrate is applied to an electronic device, the impact resistance of the electronic device can be improved, so that the electronic device has good durability.

According to a first aspect, the present disclosure provides a glass substrate. Two opposite sides of the glass substrate respectively have a first surface compressive stress layer and a second surface compressive stress layer; a surface compressive stress of the first surface compressive stress layer is greater than a surface compressive stress of the second surface compressive stress layer; and a depth of the first surface compressive stress layer is less than a depth of the second surface compressive stress layer.

In the present disclosure, compressive stresses on two side surfaces of the glass substrate are asymmetrically distributed. The first surface compressive stress layer has a high surface compressive stress, which can resist an impact of a hard object. The second surface compressive stress layer has a large depth and can withstand a higher bending tension. When the glass substrate is applied in an electronic device, a first surface of the glass substrate serves as an outer surface of the electronic device, and a second surface of the glass substrate is close to an electronic component. When the electronic device is impacted by an external object, the glass substrate can effectively protect the electronic device and improve the reliability of the electronic device.

The glass substrate provided in the first aspect of the present disclosure has high mechanical strength and good impact resistance and drop resistance, and can be applied to a vehicle-mounted display device, a mobile phone cover plate, and related daily household appliances and consumer electronic products, so that the electronic device has high strength, impact resistance and drop resistance, and the reliability and safety of the product are improved.

According to a second aspect, the present disclosure provides a method for preparing a glass substrate, used for preparing the glass substrate as described in the first aspect of the present disclosure. The method includes: a glass substrate precursor is provided, the glass substrate precursor includes two opposite side surfaces, and a first protective layer is arranged on one side surface to obtain the glass substrate precursor with the first protective layer; the glass substrate precursor with the first protective layer is placed in molten salt for primary strengthening to form a compressive stress layer on one side of the glass substrate precursor without the first protective layer arranged; the first protective layer is removed, and a second protective layer is arranged on one side surface of the glass substrate precursor with the compressive stress layer arranged; and the glass substrate precursor with the second protective layer is placed in the molten salt for secondary strengthening to form a compressive stress layer on one side of the glass substrate precursor without the second protective layer arranged, and the second protective layer is removed to obtain the glass substrate.

According to a third aspect, the present disclosure provides an electronic device, including an electronic component and a glass cover plate covering the electronic component. The glass cover plate includes the glass substrate as described in the first aspect of the present disclosure.

DETAILED DESCRIPTION

The technical solutions in embodiments of the present disclosure are described in the following with reference to the accompanying drawings. Apparently, the described embodiments are merely some rather than all of the embodiments of the present disclosure. Other embodiments obtained by a person of ordinary skill in the art based on the embodiments of the present disclosure without making creative efforts shall fall within the protection scope of the present disclosure.

Figure 5:
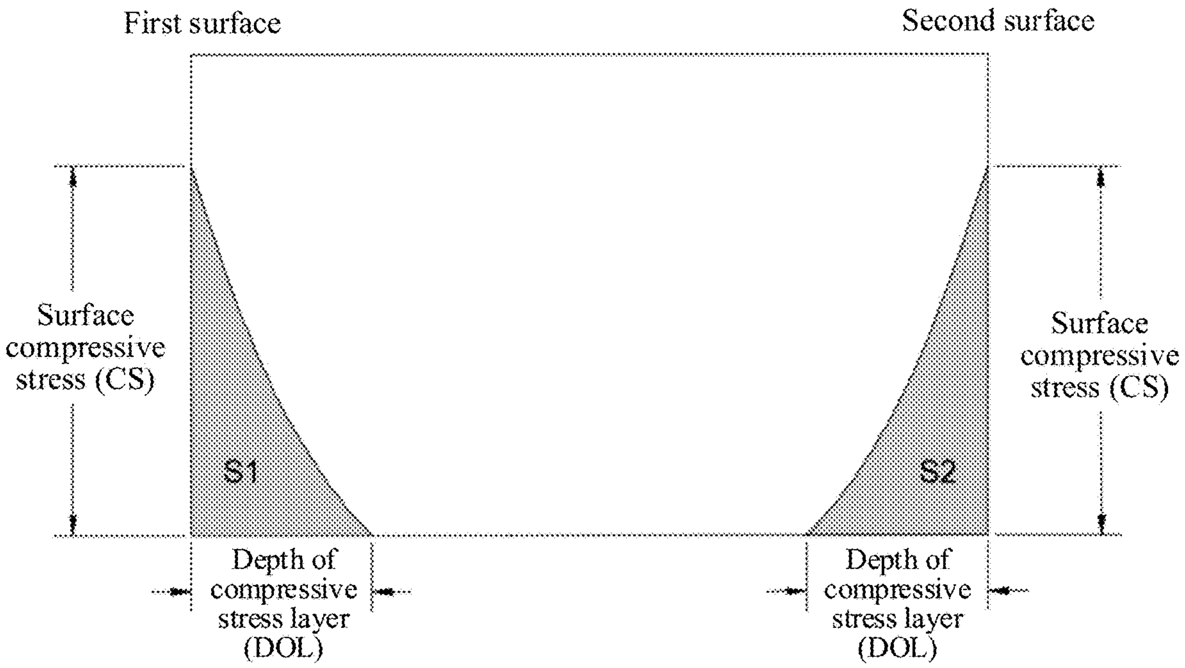
FIG. 5 is a stress distribution curve chart of a glass plate in a thickness direction according to an embodiment of the present disclosure.

For ease of understanding, some terms used in the present disclosure are explained as follows: Depth of compressive stress layer (DOL) refers to a distance from a position where a compressive stress inside glass is 0 to a surface of the glass. Herein, a depth of a compressive stress layer is the same concept as the DOL. Compressive stress integral refers to an integral of the compressive stress and the DOL, that is, an area between the compressive stress and the DOL. As shown in FIG. 5, a compressive stress integral of a first surface compressive stress layer is S1, and a compressive stress integral of a second surface compressive stress layer is S2.

Glass is widely used in electronic products because of its good aesthetics. However, the glass has poor impact resistance and is easy to break. In order to improve the mechanical properties of the glass, the glass needs to be strengthened. After the strengthening, a surface of the glass will generate a compressive stress, and a tensile stress that counteracts the compressive stress will be generated inside the glass. If the internal tensile stress exceeds a limit that the glass can withstand, the glass will explode by itself. In order to obtain glass with high impact resistance and good stability, the present disclosure provides a glass substrate. The glass substrate has different compressive stress distributions on two opposite side surfaces, so that one side of the glass substrate can withstand an impact of a hard object, and the other side can withstand the tension of a bending deformation. The compressive stress distributions can optimize the performance of the two sides of the glass substrate when the glass does not explode by itself, so that the two side surfaces of the glass substrate have their own advantages to adapt to applications of the glass substrate in the electronic device. The application of the glass substrate in the electronic device can improve the impact resistance of the electronic device, so that the electronic device has good durability.

Figure 1:
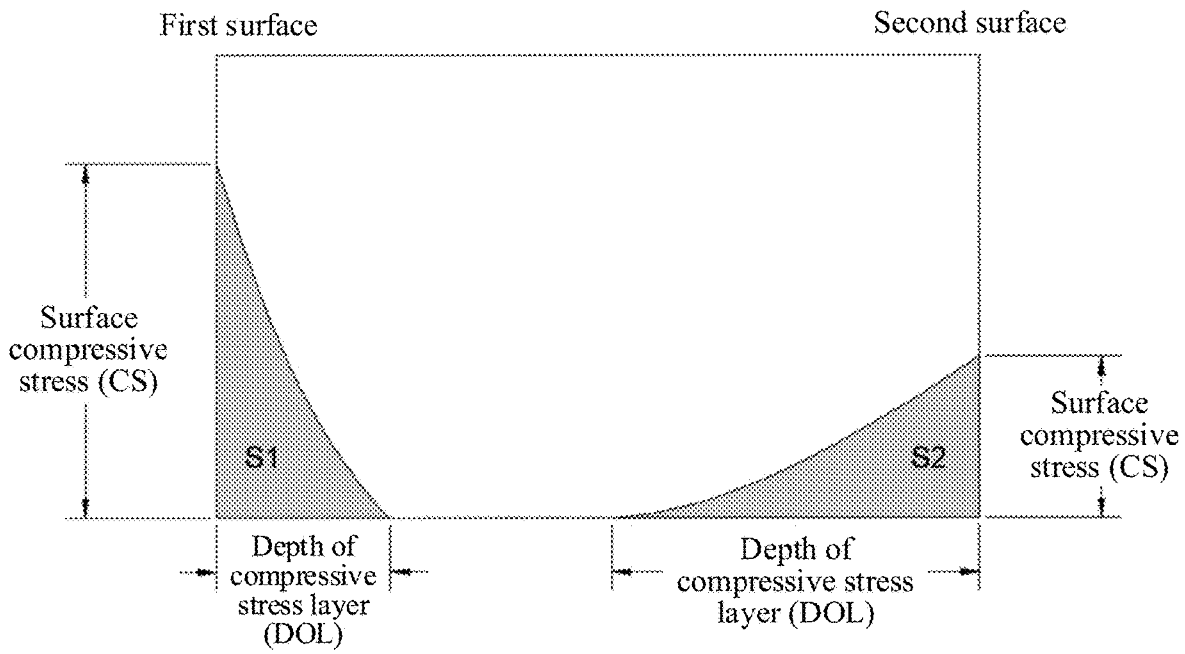
FIG. 1 is a stress distribution curve chart of a glass substrate in a thickness direction according to an embodiment of the present disclosure.

Generally, a surface of the electronic device may be impacted. When glass is applied to the electronic device, only one side surface of the glass will serve as an impact surface. Based on the above scenario, the present disclosure redesigns the compressive stress distributions on the two sides of the glass while maintaining the same tensile stress inside the glass, which optimizes the performance of the two side surfaces of the glass. Referring to FIG. 1, FIG. 1 is a stress distribution curve chart of a glass substrate in a thickness direction according to an embodiment of the present disclosure. The glass substrate of the present disclosure includes a first surface and a second surface which are opposite to each other. One side of the first surface of the glass substrate has a first surface compressive stress layer, and one side of the second surface of the glass substrate has a second surface compressive stress layer. A surface compressive stress of the first surface compressive stress layer is greater than a surface compressive stress of the second surface compressive stress layer, and a depth of the first surface compressive stress layer is less than a depth of the second surface compressive stress layer. When glass is impacted by a hard object, the impact surface is subjected to a compressive stress, and a back surface of the impact surface is subjected to a tensile stress due to bending. The first surface of the glass substrate in the present disclosure has a higher surface compressive stress, which can resist the impact of the hard object and avoid direct puncturing by the glass. The second surface of the glass substrate has a larger depth, which can withstand higher bending tension and prevent the glass from being broken, thereby greatly improving the comprehensive performance of the glass substrate and making the glass substrate better adapt to application scenarios.

In one embodiment of the present disclosure, a ratio of an absolute value of a difference between a compressive stress integral of the first surface compressive stress layer and a compressive stress integral of the second surface compressive stress layer to the compressive stress integral of any surface compressive stress layer is less than or equal to 5%. That is, the absolute value of the difference between the compressive stress integral S1 of the first surface compressive stress layer of the glass substrate and the compressive stress integral S2 of the second surface compressive stress layer is |S1−S2|. If Sx represents any value of S1 and S2 (Sx can represent S1 or S2) or a smaller value, the ratio of |S1−S2| to Sx is less than or equal to 5%. Specifically, when S1 is equal to S2, the ratio of |S1−S2| to S2 or the ratio of |S1−S2| to S1 is less than or equal to 5%. When S1 is greater than S2, the ratio of |S1−S2| to S2 is less than or equal to 5%. When S2 is greater than S1, the ratio of |S1−S2| to S1 is less than or equal to 5%. The ratio of |S1−S2| to Sx can be specifically, but not limited to, 5%, 3%, 2%, 1%, 0.5%, or 0%. When the absolute value |S1−S2| of the difference in the compressive stress integrals of the compressive stress layers on the two sides of the glass, forces on the two sides of the glass are not balanced, which easily causes deformation and reduces the structural stability of the glass substrate. Preferably, the compressive stress integral of the first surface compressive stress layer of the glass substrate is equal to the compressive stress integral of the second surface compressive stress layer, that is, the absolute value of the difference between the compressive stress integral of the first surface compressive stress layer of the glass substrate and the compressive stress integral of the second surface compressive stress layer is 0. When the compressive stress integrals of the two sides of the glass substrate are equal, the forces on the two sides of the glass substrate are balanced, the flatness of the glass substrate is high, and the glass substrate has high structural stability. In some embodiments of the present disclosure, the compressive stress integral of the first surface compressive stress layer of the glass substrate is greater than the compressive stress integral of the second surface compressive stress layer. Since the first surface of the glass substrate serves as the impact surface and withstand a high external force, on the premise that the ratio of the absolute value |S1−S2| of the difference between the surface compressive stress integrals of the two sides of the glass substrate to the compressive stress integral of any surface compressive stress layer is less than or equal to 5%, when the compressive stress integral of the first surface compressive stress layer is high, the glass substrate can better withstand the impact of the external force, and the impact resistance of the glass substrate can be improved.

Figure 2:
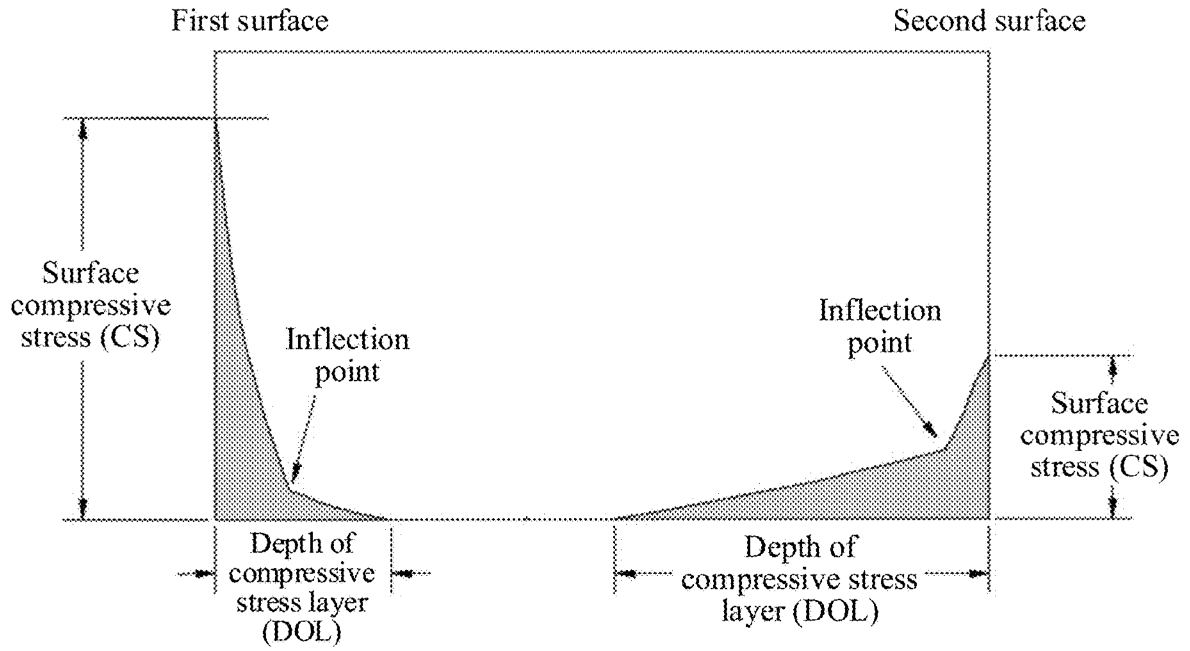
FIG. 2 is a stress distribution curve chart of a glass substrate in a thickness direction according to another embodiment of the present disclosure.

In the glass substrate of the present disclosure, a compressive stress distribution curve of one side surface of the glass substrate can be a single parabola or a function curve with an inflection point. Referring to FIG. 2, FIG. 2 is a stress distribution curve chart of a glass substrate in a thickness direction according to another embodiment of the present disclosure. A compressive stress distribution curve in FIG. 2 is a function curve with an inflection point. When the glass is strengthened for multiple times, the compressive stress distribution curve of the surface of the glass will have an inflection point, and the slopes of the function curve before and after the inflection point are not the same. When the compressive stress distribution curve of the surface of the glass substrate is the function curve with the inflection point, due to a decrease in the compressive stress, the DOL can be further increased, and the glass will not explode by itself.

In some embodiments of the present disclosure, a thickness t of the glass substrate is 0.1 mm to 5 mm. The thickness of the glass substrate can be specifically, but is not limited to, 0.1 mm, 0.5 mm, 1 mm, 2 mm, or 5 mm. The asymmetric compressive stress distributions of the surfaces of the glass substrate in the present disclosure have a significant improvement effect on the glass with the above-mentioned thicknesses, and if the thickness of the glass substrate is too thin, a central stress of the glass substrate is too high, which easily causes self-explosion. If the thickness of the glass substrate is too large, it is not in line with a lightweight and thinness trend of the electronics industry. In some embodiments of the present disclosure, the depth of the first surface compressive stress layer is greater than or equal to 0.004 mm and less than or equal to 0.1t, and the depth of the second surface compressive stress layer is greater than or equal to 0.085 mm and less than or equal to 0.6t. 0.1t refers to a product of the thickness t of the glass substrate and 0.1, and 0.6t refers to a product of the thickness t of the glass substrate and 0.6. For example, when the thickness of the glass substrate is 0.5 mm, the depth of the first surface compressive stress layer is 0.004 mm to 0.05 mm, and the depth of the second surface compressive stress layer is 0.085 mm to 0.3 mm. Controlling the depths of the compressive stress layers within the above ranges can ensure that the glass substrate has good bending resistance without self-explosion.

In one embodiment of the present disclosure, a surface compressive stress of the first surface compressive stress layer is 700 MPa to 1200 MPa. A surface compressive stress of the first surface compressive stress layer can be, but is not limited to, 700 MPa, 800 MPa, 1000 MPa, or 1200 MPa. In one embodiment of the present disclosure, a surface compressive stress of the second surface compressive stress layer is 300 MPa to 850 MPa. A surface compressive stress of the second surface compressive stress layer can be, but is not limited to, 300 MPa, 400 MPa, 500 MPa, 700 MPa, or 850 MPa. In this embodiment of the present disclosure, a ratio of the surface compressive stress of the first surface compressive stress layer to the surface compressive stress of the second surface compressive stress layer is greater than or equal to 1.2. The ratio of the surface compressive stresses of the two sides of the glass substrate is controlled within the above ranges, the mechanical properties of the glass substrate can be effectively improved.

In one embodiment of the present disclosure, a material of the glass substrate includes one or more of lithium aluminum silicate glass, sodium calcium silicate glass, and soda lime glass. In one embodiment of the present disclosure, a bending strength of the glass substrate is 1000 MPa to 2100 MPa, where the bending strength refers to the bending strength of the second surface of the glass substrate. In one embodiment of the present disclosure, a size of the glass substrate can be adjusted as needed, and the size of the glass substrate has no effect on the stress distributions. In some embodiments of the present disclosure, an area of the glass substrate is 0.5 $cm^2$ to 1 $m^2$.

The first surface of the glass substrate provided in the present disclosure has high compressive stress and can resist damage caused by a sharp object. The second surface has a large DOL and can withstand greater damage caused by the bending. The advantage of a single surface of the glass substrate can be more significant by adjusting the compressive stress distributions of the two sides of the glass substrate, thus satisfying the application of the glass substrate in the electronic device.

In the present disclosure, the compressive stress layers on the two sides of the glass substrate can be formed through chemical strengthening or physical tempering.

Figure 3:
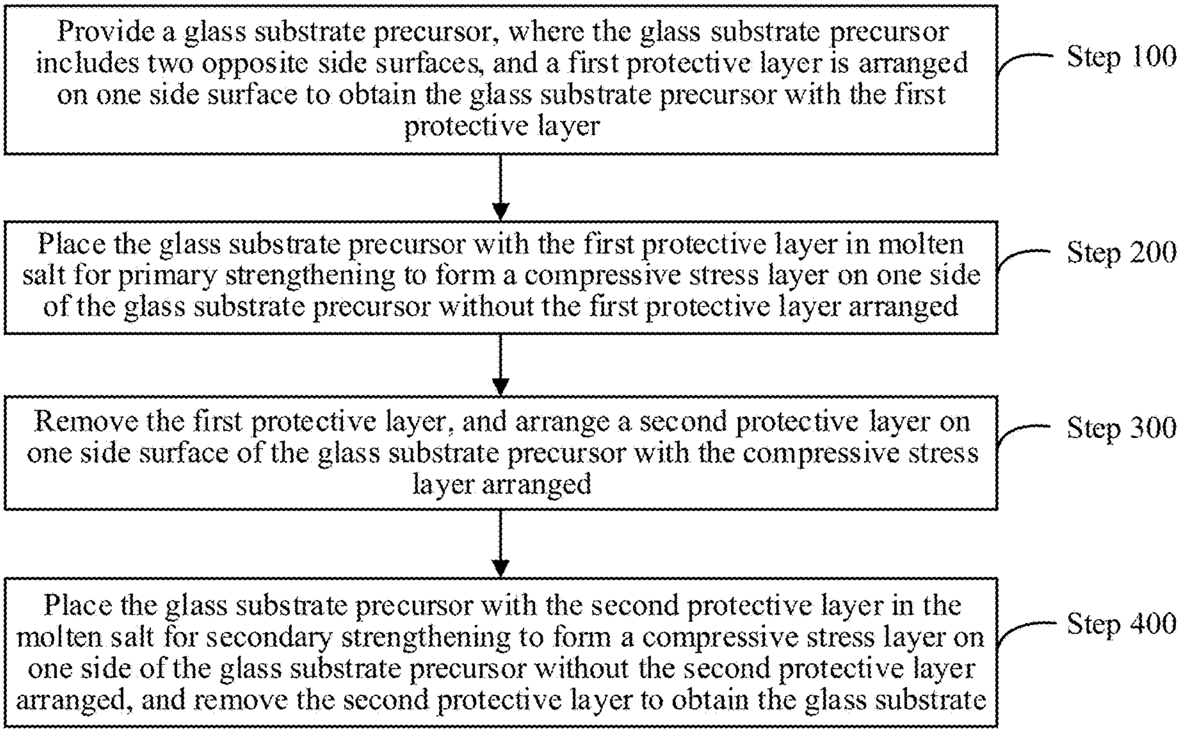
FIG. 3 is a flowchart of a method for preparing a glass substrate according to an embodiment of the present disclosure.

The present disclosure further provides a method for preparing a glass substrate, which is used for preparing the above-mentioned glass substrate. Referring to FIG. 3, FIG. 3 is a flowchart of a method for preparing a glass substrate according to an embodiment of the present disclosure. The method is used to strengthen glass. To form different stress distributions on two sides of the glass, the surfaces on the two sides of the glass are strengthened separately. The method specifically includes:

Step 100: A glass substrate precursor is provided, the glass substrate precursor includes two opposite side surfaces, and a first protective layer is arranged on one side surface to obtain the glass substrate precursor with the first protective layer.

Step 200: The glass substrate precursor with the first protective layer is placed in molten salt for primary strengthening to form a compressive stress layer on one side of the glass substrate precursor without the first protective layer arranged.

Step 300: The first protective layer is removed, and a second protective layer is arranged on one side surface of the glass substrate precursor with the compressive stress layer arranged.

Step 400: The glass substrate precursor with the second protective layer is placed in the molten salt for secondary strengthening to form a compressive stress layer on one side of the glass substrate precursor without the second protective layer arranged, and the second protective layer is removed to obtain the glass substrate.

In the present disclosure, the glass substrate with a target compressive stress distribution can be formed by controlling the kind, temperature, and strengthening time of the molten salt. In one embodiment of the present disclosure, the molten salt is sodium salt and potassium salt. In some embodiments of the present disclosure, the molten salt includes one or more of potassium nitrate and sodium nitrate. When the potassium nitrate is used to strengthen the glass substrate precursor, a single parabola-type compressive stress distribution curve can be formed. When mixed salt, such as a mixture of the sodium nitrate and the potassium nitrate, is used, or the sodium nitrate and the potassium nitrate are respectively used, for strengthening, a compressive stress distribution curve with an inflection point can be formed. In one embodiment of the present disclosure, a temperature of the molten salt is 360° C. to 450° C. The temperature of the molten salt can be specifically, but is not limited to, 360° ° C., 380° C., 400° C., 430° C., or 450° C. When the temperature of the molten salt is high, the strengthening time required to reach a specified DOL is shorter. In one embodiment of the present disclosure, the time of the primary strengthening and/or the secondary strengthening is 60 min to 200 min. If the strengthening time is longer, the DOL strengthened at a specified temperature is larger. In one embodiment of the present disclosure, the primary strengthening and/or the secondary strengthening can be carried out step by step using various kinds of molten salt. For example, the primary strengthening can be carried out by first using the molten sodium nitrate for 10 min and then using the molten potassium nitrate for 90 min, so that the time of the primary strengthening is 100 min. In one embodiment of the present disclosure, the first protective layer and the second protective layer are heat-resistant protective coatings. The coatings can protect the surface of the glass and prevent ion exchange on the surface of the glass.

In one embodiment of the present disclosure, in order to make the surface compressive stress of the first surface compressive stress layer greater than the surface compressive stress of the second surface compressive stress layer, during the strengthening of a first surface, the potassium nitrate with higher purity is used, and the strengthening time is appropriately shortened. In one embodiment of the present disclosure, in order to make a depth of the second surface compressive stress layer greater than a depth of the first surface compressive stress layer, during the strengthening of a second surface, mixed molten salt in a certain proportion is used, and the strengthening time is appropriately prolonged.

In one embodiment of the present disclosure, physical tempering can also be used to strengthen the glass to obtain the glass substrate of the present disclosure.

The present disclosure further provides a glass cover plate. The glass cover plate includes the glass substrate mentioned above, where an outer surface of the glass cover plate is the first surface of the glass substrate, and an inner surface of the glass cover plate is the second surface of the glass substrate. The glass cover plate has high mechanical strength and is not easily broken in a daily usage scenario. In one embodiment of the present disclosure, a portion of the glass cover plate adopts the glass substrate, and another portion of the glass cover plate adopts another material such as plastic and metal. The glass cover plate can also be entirely made of the glass substrate. Specific size of the glass cover plate can be adjusted or the glass cover plate can be processed based on actual needs, and will not be elaborated in one embodiment. In some embodiments of the present disclosure, the glass cover plate can be applied to a housing or display screen of a communication device. The glass cover plate has the characteristics of good texture, easy heat dissipation, and high impact resistance, and does not affect signals of the communication device. Therefore, the glass cover plate can be widely used in the field of communications, especially in the field of 5G communications.

Figure 4:
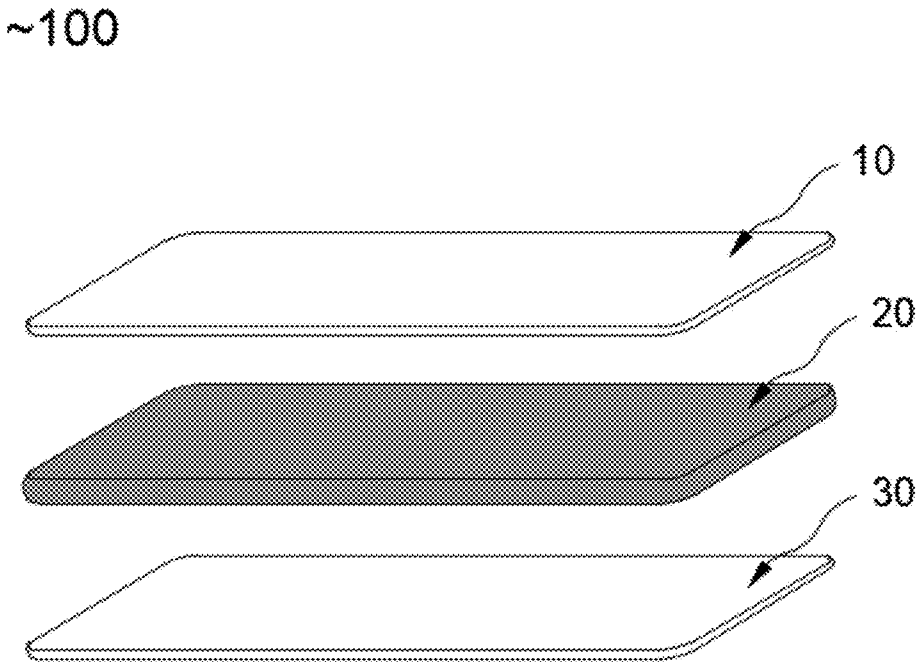
FIG. 4 is a schematic structural diagram of an electronic device according to an embodiment of the present disclosure.

The present disclosure further provides an electronic device. Referring to FIG. 4, FIG. 4 is a schematic structural diagram of an electronic device 100 according to an embodiment of the present disclosure. The electronic device 100 includes a screen cover plate 10, an electronic component 20, and a back cover plate 30. The screen cover plate 10 and the back cover plate 30 cover the electronic component 20. In one embodiment of the present disclosure, the screen cover plate or the back cover plate is a glass cover plate provided in the present disclosure, or both the screen cover plate and the back cover plate are glass cover plates provided in the present disclosure. When the glass cover plate is applied to an electronic device, an outer surface of the glass cover plate is a surface far away from the electronic component, and an inner surface of the glass cover plate is a surface close to the electronic component. Due to a high compressive stress on the first surface of the glass substrate, the outer surface of the glass cover plate can withstand an external impact. The second surface of the glass substrate has a greater compressive stress depth, and the inner surface of the glass cover plate can withstand a higher bending tension, thus effectively protecting the electronic component and prolonging the service life of the electronic device. In one embodiment of the present disclosure, the electronic device includes but is not limited to a mobile terminal such as a mobile phone, a tablet, a laptop, a handheld computer, a wearable device, a smart wristband, a smartwatch, and a pedometer, and a fixed terminal such as a digital TV and a desktop computer.

The technical solutions of the present disclosure are further described in detail below with a plurality of embodiments.

Embodiment 1

A method for preparing a glass substrate includes:

A glass substrate precursor with a size of 145 mm×70 mm×0.7 mm was provided, and the brand of the glass substrate precursor was Corning GG5. A heat-resistant coating was applied to a second surface of the glass substrate precursor for protection.

Chemical strengthening was carried out twice on a first surface of the glass substrate precursor in strengthening molten salt. The glass substrate precursor was placed in $NaNO_3$ molten salt to perform primary chemical strengthening on the first surface. A temperature of the molten salt was 380° C., and the time of the primary chemical strengthening was 25 min. Then, the glass substrate precursor was placed in $KNO_3$ molten salt for secondary chemical strengthening. A temperature of the molten salt was 380° C., and the time of the secondary chemical strengthening was 90 min. A first surface compressive stress layer with a high surface compressive stress and a small DOL was formed on the first surface.

The heat-resistant protective coating on the second surface was removed, and a heat-resistant coating was applied to the first surface of the glass substrate precursor for protection.

Chemical strengthening was carried out twice on the second surface of the glass substrate precursor in the strengthening molten salt. The glass substrate precursor was placed in $NaNO_3$ molten salt to perform primary chemical strengthening on the second surface. A temperature of the molten salt was 380° C., and the time of the primary chemical strengthening was 147 min. Then, the glass substrate precursor was placed in mixed molten salt of 62% $KNO_3$ and 38% $NaNO_3$ for secondary chemical strengthening. A temperature of the molten salt was 380° C., and the time of the secondary chemical strengthening was 20 min. A second surface compressive stress layer with a low surface compressive stress and a large DOL was formed on the second surface.

The heat-resistant protective coating on the first surface is removed to obtain the glass substrate.

The glass substrate was assembled with an electronic component to obtain a mobile phone, where the first surface of the glass substrate was an outer surface of the mobile phone, and the second surface of the glass substrate was placed inside the mobile phone (close to the electronic component).

Embodiment 2

A method for preparing a glass substrate includes:

A glass substrate precursor with a size of 145 mm×70 mm×0.7 mm was provided, and the brand of the glass substrate precursor was Corning GG5. A heat-resistant coating was applied to a second surface of the glass substrate precursor for protection.

The glass substrate precursor was placed in $KNO_3$ molten salt to perform chemical strengthening on a first surface of the glass substrate precursor. A temperature of the molten salt was 380° C., and the time of the chemical strengthening was 120 min. A first surface compressive stress layer with a high surface compressive stress and a small DOL was formed on the first surface.

The heat-resistant protective coating on the second surface was removed, and a heat-resistant coating was applied to the first surface of the glass substrate precursor for protection.

Chemical strengthening was carried out twice on the second surface of the glass substrate precursor in the strengthening molten salt. The glass substrate precursor was placed in $NaNO_3$ molten salt to perform primary chemical strengthening on the second surface. A temperature of the molten salt was 380° C., and the time of the primary chemical strengthening was 122 min. Then, the glass substrate precursor was placed in mixed molten salt of 94% $KNO_3$ and 6% $NaNO_3$ for secondary chemical strengthening. A temperature of the molten salt was 380° ° C., and the time of the secondary chemical strengthening was 10 min. A second surface compressive stress layer with a low surface compressive stress and a large DOL was formed on the second surface.

The heat-resistant protective coating on the first surface was removed to obtain the glass substrate.

The glass substrate was assembled with an electronic component to obtain a mobile phone, where the first surface of the glass substrate was an outer surface of the mobile phone, and the second surface of the glass substrate was placed inside the mobile phone (close to the electronic component).

Embodiment 3

A method for preparing a glass substrate includes:

A glass substrate precursor with a size of 145 mm×70 mm×0.7 mm was provided, and the brand of the glass substrate precursor was Corning GG5. A heat-resistant coating was applied to a second surface of the glass substrate precursor for protection.

The glass substrate precursor was placed in mixed molten salt with 94% of $KNO_3$ and 6% of $NaNO_3$ to perform chemical strengthening on a first surface of the glass substrate precursor. A temperature of the molten salt was 380° C., and the time of the chemical strengthening was 32 min. A first surface compressive stress layer with a high surface compressive stress and a small DOL was formed on the first surface.

The heat-resistant protective coating on the second surface was removed, and a heat-resistant coating was applied to the first surface of the glass substrate precursor for protection.

Chemical strengthening was carried out twice on the second surface of the glass substrate precursor in the strengthening molten salt. The glass substrate precursor was placed in $NaNO_3$ molten salt to perform primary chemical strengthening on the second surface. A temperature of the molten salt was 380° C., and the time of the primary chemical strengthening was 97 min. Then, the glass substrate precursor was placed in mixed molten salt of 62% $KNO_3$ and 38% $NaNO_3$ for secondary chemical strengthening. A temperature of the molten salt was 380° ° C., and the time of the secondary chemical strengthening was 10 min. A second surface compressive stress layer with a low surface compressive stress and a large DOL was formed on the second surface.

The heat-resistant protective coating on the first surface is removed to obtain the glass substrate.

The glass substrate was assembled with an electronic component to obtain a mobile phone, where the first surface of the glass substrate was an outer surface of the mobile phone, and the second surface of the glass substrate was placed inside the mobile phone (close to the electronic component).

Embodiment 4

A method for preparing a glass substrate includes:

A glass substrate precursor with a size of 145 mm×70 mm×0.7 mm was provided, and the brand of the glass substrate precursor was Corning GG5. A heat-resistant coating was applied to a second surface of the glass substrate precursor for protection.

Chemical strengthening was carried out twice on a first surface of the glass substrate precursor in strengthening molten salt. The glass substrate precursor was placed in $NaNO_3$ molten salt to perform primary chemical strengthening on the first surface. A temperature of the molten salt was 380° C., and the time of the primary chemical strengthening was 30 min. Then, the glass substrate precursor was placed in $KNO_3$ molten salt for secondary chemical strengthening. A temperature of the molten salt was 380° C., and the time of the secondary chemical strengthening was 20 min. A first surface compressive stress layer with a high surface compressive stress and a small DOL was formed on the first surface.

The heat-resistant protective coating on the second surface was removed, and a heat-resistant coating was applied to the first surface of the glass substrate precursor for protection.

Chemical strengthening was carried out twice on the second surface of the glass substrate precursor in the strengthening molten salt. The glass substrate precursor was placed in $NaNO_3$ molten salt to perform primary chemical strengthening on the second surface. A temperature of the molten salt was 380° C., and the time of the primary chemical strengthening was 65 min. Then, the glass substrate precursor was placed in mixed molten salt of 62% $KNO_3$ and 38% $NaNO_3$ for secondary chemical strengthening. A temperature of the molten salt was 380° C., and the time of the secondary chemical strengthening was 20 min. A second surface compressive stress layer with a low surface compressive stress and a large DOL was formed on the second surface.

The heat-resistant protective coating on the first surface was removed to obtain the glass substrate.

The glass substrate was assembled with an electronic component to obtain a mobile phone, where the first surface of the glass substrate was an outer surface of the mobile phone, and the second surface of the glass substrate was placed inside the mobile phone (close to the electronic component).

Embodiment 5

A method for preparing a glass substrate includes:

A glass substrate precursor with a size of 145 mm×70 mm×0.7 mm was provided, and the brand of the glass substrate precursor was Corning GG5. A heat-resistant coating was applied to a second surface of the glass substrate precursor for protection.

Chemical strengthening was carried out twice on a first surface of the glass substrate precursor in strengthening molten salt. The glass substrate precursor was placed in $NaNO_3$ molten salt to perform primary chemical strengthening on the first surface. A temperature of the molten salt was 380° C., and the time of the primary chemical strengthening was 30 min. Then, the glass substrate precursor was placed in $KNO_3$ molten salt for secondary chemical strengthening. A temperature of the molten salt was 380° C., and the time of the secondary chemical strengthening was 125 min. A first surface compressive stress layer with a high surface compressive stress and a small DOL was formed on the first surface.

The heat-resistant protective coating on the second surface was removed, and a heat-resistant coating was applied to the first surface of the glass substrate precursor for protection.

Chemical strengthening was carried out twice on the second surface of the glass substrate precursor in the strengthening molten salt. The glass substrate precursor was placed in $NaNO_3$ molten salt to perform primary chemical strengthening on the second surface. A temperature of the molten salt was 380° C., and the time of the primary chemical strengthening was 210 min. Then, the glass substrate precursor was placed in mixed molten salt of 62% $KNO_3$ and 38% $NaNO_3$ for secondary chemical strengthening. A temperature of the molten salt was 380° C., and the time of the secondary chemical strengthening was 10 min. A second surface compressive stress layer with a low surface compressive stress and a large DOL was formed on the second surface.

The heat-resistant protective coating on the first surface was removed to obtain the glass substrate.

The glass substrate was assembled with an electronic component to obtain a mobile phone, where the first surface of the glass substrate was an outer surface of the mobile phone, and the second surface of the glass substrate was placed inside the mobile phone (close to the electronic component).

Embodiment 6

A method for preparing a glass substrate includes:

A glass substrate precursor with a size of 145 mm×70 mm×0.7 mm was provided, and the brand of the glass substrate precursor was Corning GG5. A heat-resistant coating was applied to a second surface of the glass substrate precursor for protection.

Chemical strengthening was carried out twice on a first surface of the glass substrate precursor in strengthening molten salt. The glass substrate precursor was placed in $NaNO_3$ molten salt to perform primary chemical strengthening on the first surface. A temperature of the molten salt was 380° C., and the time of the primary chemical strengthening was 30 min. Then, the glass substrate precursor was placed in $KNO_3$ molten salt for secondary chemical strengthening. A temperature of the molten salt was 380° C., and the time of the secondary chemical strengthening was 60 min. A first surface compressive stress layer with a high surface compressive stress and a small DOL was formed on the first surface.

The heat-resistant protective coating on the second surface was removed, and a heat-resistant coating was applied to the first surface of the glass substrate precursor for protection.

Chemical strengthening was carried out twice on the second surface of the glass substrate precursor in the strengthening molten salt. The glass substrate precursor was placed in $NaNO_3$ molten salt to perform primary chemical strengthening on the second surface. A temperature of the molten salt was 380° C., and the time of the primary chemical strengthening was 90 min. Then, the glass substrate precursor was placed in mixed molten salt of 62% $KNO_3$ and 38% $NaNO_3$ for secondary chemical strengthening. A temperature of the molten salt was 380° C., and the time of the secondary chemical strengthening was 60 min. A second surface compressive stress layer with a low surface compressive stress and a large DOL was formed on the second surface.

The heat-resistant protective coating on the first surface was removed to obtain the glass substrate.

The glass substrate was assembled with an electronic component to obtain a mobile phone, where the first surface of the glass substrate was an outer surface of the mobile phone, and the second surface of the glass substrate was placed inside the mobile phone (close to the electronic component).

Embodiment A

A method for preparing a glass plate includes:

A glass plate precursor with a size of 145 mm×70 mm×0.7 mm was provided, and the brand of the glass plate precursor was Corning GG5.

The glass plate precursor was placed in $KNO_3$ molten salt to perform chemical strengthening. A temperature of the molten salt was 380° C., and the time of the chemical strengthening was 120 min. Symmetric compressive stress distributions were formed on two side surfaces of the glass plate. Referring to FIG. 5, FIG. 5 is a stress distribution curve chart of a glass plate in a thickness direction according to Embodiment A.

The glass plate was assembled with an electronic component to obtain a mobile phone.

Embodiment B

A difference between Embodiment B and Embodiment A was that the chemical strengthening was carried out twice. The chemical strengthening specifically includes:

The glass plate precursor was placed in $NaNO_3$ molten salt to perform primary chemical strengthening. A temperature of the molten salt was 380° C., and the time of the primary chemical strengthening was 8 min. Then, the glass plate precursor was placed in $KNO_3$ molten salt for secondary chemical strengthening. A temperature of the molten salt was 380° C., and the time of the secondary chemical strengthening was 90 min. Symmetric compressive stress distributions were formed on two side surfaces of the glass plate.

The glass plate was assembled with an electronic component to obtain a mobile phone.

Embodiment C

A method for preparing a glass plate includes:

A glass plate precursor with a size of 145 mm×70 mm×0.7 mm was provided, and the brand of the glass plate precursor was Corning GG5. A heat-resistant coating was applied to a second surface of the glass plate precursor for protection.

Chemical strengthening was carried out on a first surface of a glass plate twice in strengthening molten salt. The glass plate precursor was placed in $KNO_3$ molten salt to perform the chemical strengthening on the first surface. A temperature of the molten salt was 380° C., and the time of the primary chemical strengthening was 65 min.

The heat-resistant protective coating on the second surface was removed, and a heat-resistant coating was applied to the first surface of the glass plate precursor for protection.

Chemical strengthening was carried out twice on the second surface of the glass plate in the strengthening molten salt. The glass plate precursor was placed in $NaNO_3$ molten salt to perform primary chemical strengthening on the second surface. A temperature of the molten salt was 380° C., and the time of the primary chemical strengthening was 8 min. Then, the glass substrate precursor was placed in $KNO_3$ molten salt for secondary chemical strengthening. A temperature of the molten salt was 380° C., and the time of the secondary chemical strengthening was 20 min. A second surface compressive stress layer with a low surface compressive stress and a large DOL was formed on the second surface.

The heat-resistant protective coating on the first surface was removed to obtain the glass plate.

The glass plate was assembled with an electronic component to obtain a mobile phone, where the first surface of the glass plate was an outer surface of the mobile phone, and the second surface of the glass plate was placed inside the mobile phone (close to the electronic component).

Effect Embodiment

To verify the performance of a ceramic outer member produced in the present disclosure, the present disclosure further provides an effect embodiment.

1) FSM-6000LEUV Plus from Shenzhen Tianye Instrument Co., Ltd., was used to conduct a stress test on the glass substrates of Embodiments 1 to 6 and the glass plates of Embodiments A to C, and compressive stress distribution curves were obtained. Stress parameters of the glass substrates of Embodiments 1 to 6 and the glass plates of Embodiments A to C were shown in Table 1, DOL represents the depth of compressive stress layer, CS represents the surface compressive stress, |S1−S2|/Sx represents the ratio of the difference in compressive stress integrals of the two side surfaces to the compressive stress integral of one side surface; and Sx is the smaller compressive stress integral value of the compressive stress layers of the first surface and the second surface.

TABLE 1

Compressive stress distributions of the glass substrates in Embodiments 1 to 6 and the glass plates in Embodiments A to C

| Experiment group | First surface CS (MPa) | First surface DOL (μm) | Second surface CS (MPa) | Second surface DOL (μm) | $\lvert S1 - S2\rvert/S_x$ |
|---|---|---|---|---|---|
| Embodiment 1 | 1020 | 52 | 500 | 136 | 1.61% |
| Embodiment 2 | 1000 | 13 | 800 | 110 | 0.93% |
| Embodiment 3 | 800 | 60 | 500 | 96 | 2.66% |
| Embodiment 4 | 1100 | 57 | 769 | 91 | 0.3% |
| Embodiment 5 | 1000 | 73 | 490 | 200 | 2.69% |
| Embodiment 6 | 1000 | 73 | 490 | 165 | 0.07% |
| Embodiment A | 999 | 13 | 999 | 13 | 0% |
| Embodiment B | 1000 | 30 | 1020 | 30 | 0% |
| Embodiment C | 841 | 10 | 1020 | 30 | 4.11% |

2) A drop test machine was used to conduct a sandpaper drop test on the products of Embodiments 1 to 6 and Embodiments A to C, to test their drop resistance. A test method specifically includes: A vacuum nozzle of the test machine was adjusted to a horizontal state to suck an electronic product, with the glass substrates or the glass plates facing downwards. 80-mesh sandpaper was horizontally placed on a test tabletop below the nozzle (the test tabletop was a marble plane) to ensure that the sandpaper is flat and not warped. After the products were lifted to test heights, the products were deflated and started to fall. Drop heights increased 5 cm step by step from 50 cm until the glass surfaces were damaged. Heights before the glass was damaged were recorded (the maximum heights when the glass surfaces were not damaged). Experimental results of the sandpaper drop test were as shown in Table 2.

3) A bending strength tester was used to conduct a bending strength test on the glass substrates of Embodiments 1 to 6 and the glass plates of Embodiments A to C. Based on the usage of the products (the first surface of the glass substrate was the impact surface, and the second surface of the glass substrate was subjected to the bending tension), the bending tensions on the second surfaces of the glass substrates and the second surfaces of the glass plates were tested. Specific test processes were as follows: The strength test was conducted with the second surfaces of the glass cover plates at the bottom and the first surfaces at the top, with a distance between upper supporting plates being 20 mm, a distance between lower supporting plates being 40 mm, and a descending speed being 3 mm/min. The products were pressed until the glass was broken. The maximum force P at the time of breakage was recorded. The bending strength was calculated using the following formula:

$$\text{bending strength} = 3P \times (40 - 20) \times 0.001/(2 \times \text{glass width} \times \text{glass thickness} \times \text{glass thickness})$$

The experimental results of the bending strength test were shown in Table 2.

TABLE 2

Performance parameter table of the glass substrates in Embodiments 1 to 6 and the glass plates in Embodiments A to C

| Experiment group | Maximum height of non-broken glass (cm) | Bending strength (MPa) |
|---|---|---|
| Embodiment 1 | 125 | 1452 |
| Embodiment 2 | 120 | 1355 |
| Embodiment 3 | 105 | 1147 |
| Embodiment 4 | 150 | 1858 |
| Embodiment 5 | 130 | 1576 |
| Embodiment 6 | 130 | 1621 |
| Embodiment A | 85 | 380 |
| Embodiment B | 50 | 920 |
| Embodiment C | 50 | 980 |

From Table 2, it can be seen that compared with the glass plates using the symmetric distribution, the glass substrates of the embodiments of the present disclosure had higher drop resistance and bending strength in specific application scenarios. When the glass substrates were applied in the electronic device, the glass substrates could effectively protect the electronic device, thereby prolonging the service life of the electronic device.

Certain embodiments of the present disclosure are described above, but they should not be construed as a limitation on the scope of the present disclosure. It should be noted that a person of ordinary skill in the art may make several improvements and modifications without departing from the principle of the present disclosure. These improvements and modifications shall fall within the protection scope of the present disclosure.

What is claimed is:

1. A glass substrate, comprising:

a first surface compressive stress layer and a second surface compressive stress layer respectively disposed on two opposite sides of the glass substrate, wherein the first surface compressive stress layer of the glass substrate is a top surface and an impact surface of the glass substrate, and the second surface compressive stress layer is a back surface of the glass substrate, a surface compressive stress of the first surface compressive stress layer being greater than a surface compressive stress of the second surface compressive stress layer; and a depth of the first surface compressive stress layer being less than a depth of the second surface compressive stress layer.

2. The glass substrate according to claim 1, wherein a ratio of an absolute value of a difference between a compressive stress integral of the first surface compressive stress layer and a compressive stress integral of the second surface compressive stress layer to the compressive stress integral of any surface compressive stress layer is less than or equal to 5%.

3. The glass substrate according to claim 2, wherein:

when the compressive stress integral of the first surface compressive stress layer obtained is equal to the compressive stress integral of the second surface compressive stress layer, the ratio of the absolute value of the difference between the compressive stress integral of the first surface compressive stress layer and the compressive stress integral of the second surface compressive stress layer to the compressive stress integral of the first surface compressive stress layer or the compressive stress integral of the second surface compressive stress layer is less than or equal to 5%;

when the compressive stress integral of the first surface compressive stress layer obtained is greater than the compressive stress integral of the second surface compressive stress layer, the ratio of the absolute value of the difference between the compressive stress integral of the first surface compressive stress layer and the compressive stress integral of the second surface compressive stress layer to the compressive stress integral of the second surface compressive stress layer is less than or equal to 5%; and when the compressive stress integral of the first surface compressive stress layer obtained is less than the compressive stress integral of the second surface compressive stress layer, the ratio of the absolute value of the difference between the compressive stress integral of the first surface compressive stress layer and the compressive stress integral of the second surface compressive stress layer to the compressive stress integral of the first surface compressive stress layer is less than or equal to 5%.

4. The glass substrate according to claim 1, wherein a surface compressive stress of the first surface compressive stress layer is 700 MPa to 1200 MPa; and a surface compressive stress of the second surface compressive stress layer is 300 MPa to 850 MPa.

5. The glass substrate according to claim 1, wherein a ratio of the surface compressive stress of the first surface compressive stress layer to the surface compressive stress of the second surface compressive stress layer is greater than or equal to 1.2.

6. The glass substrate according to claim 1, wherein when a thickness of the glass substrate is t, a depth of the first surface compressive stress layer is greater than or equal to 0.004 mm and is less than or equal to 0.1t; and the depth of the second surface compressive stress layer is greater than or equal to 0.085 mm and less than or equal to 0.6t.

7. The glass substrate according to claim 1, wherein the thickness t of the glass substrate is 0.1 mm to 5 mm.

8. The glass substrate according to claim 1, wherein a material of the glass substrate comprises one or more of lithium aluminum silicate glass, sodium calcium silicate glass, and soda-lime glass.

9. The glass substrate according to claim 1, wherein the first surface compressive stress layer and/or the second surface compressive stress layer are obtained by performing chemical strengthening or physical tempering on a glass substrate.

10. A method for preparing a glass substrate, wherein two opposite sides of the glass substrate respectively have a first surface compressive stress layer and a second surface compressive stress layer; a surface compressive stress of the first surface compressive stress layer is greater than a surface compressive stress of the second surface compressive stress layer; and a depth of the first surface compressive stress layer is less than a depth of the second surface compressive stress layer, the method comprising:

providing a glass substrate precursor, the glass substrate precursor comprising two opposite side surfaces, and a first protective layer being arranged on one side surface to obtain the glass substrate precursor with the first protective layer;

placing the glass substrate precursor with the first protective layer in molten salt for primary strengthening to form a compressive stress layer on one side of the glass substrate precursor without the first protective layer arranged;

removing the first protective layer, and arranging a second protective layer on one side surface of the glass substrate precursor with the compressive stress layer arranged; and placing the glass substrate precursor with the second protective layer in the molten salt for secondary strengthening to form a compressive stress layer on one side of the glass substrate precursor without the second protective layer arranged, and removing the second protective layer to obtain the glass substrate.

11. An electronic device, comprising an electronic component and a glass cover plate covering the electronic component, the glass cover plate comprising a glass substrate, and the glass substrate comprising:

a first surface compressive stress layer and a second surface compressive stress layer respectively disposed on two opposite sides of the glass substrate, a surface compressive stress of the first surface compressive stress layer being greater than a surface compressive stress of the second surface compressive stress layer; and a depth of the first surface compressive stress layer being less than a depth of the second surface compressive stress layer, wherein in the glass substrate, the second surface compressive stress layer is closer to the electronic component, and the first surface compressive stress layer is farther away from the electronic component.

12. The electronic device according to claim 11, wherein the glass cover plate is a screen cover plate and/or a back cover plate of the electronic device.

* * * * *